(12) United States Patent
Remy

(10) Patent No.: US 8,150,564 B2
(45) Date of Patent: Apr. 3, 2012

(54) METHOD AND DEVICE FOR PROVIDING AN MULTI-ENGINE AIRCRAFT PILOT WITH DATA CONCERNING SAID ENGINES

(75) Inventor: Sébastien Remy, Cazeres (FR)

(73) Assignee: Airbus, Blagnac (FR)

(*) Notice: Subject to any disclaimer, the term of this patent is extended or adjusted under 35 U.S.C. 154(b) by 963 days.

(21) Appl. No.: 12/067,793

(22) PCT Filed: Sep. 13, 2006

(86) PCT No.: PCT/FR2006/002090
§ 371 (c)(1),
(2), (4) Date: Mar. 21, 2008

(87) PCT Pub. No.: WO2007/034049
PCT Pub. Date: Mar. 29, 2007

(65) Prior Publication Data
US 2008/0249671 A1    Oct. 9, 2008

(30) Foreign Application Priority Data

Sep. 22, 2005  (FR) ...................................... 05 09700

(51) Int. Cl.
*G01C 23/00* (2006.01)
*G01K 1/00* (2006.01)

(52) U.S. Cl. .......................................... 701/3; 702/130

(58) Field of Classification Search ................... 701/3, 4, 701/7, 8, 10, 14; 702/99, 130, 144; 244/53 R; 60/39.12, 200.1, 233, 238, 281, 282, 39.465
See application file for complete search history.

(56) References Cited

U.S. PATENT DOCUMENTS

| 3,721,120 | A | | 3/1973 | Howell | |
| 4,954,974 | A | * | 9/1990 | Howell et al. | 701/100 |
| 5,142,860 | A | | 9/1992 | Strange | |
| 5,165,240 | A | * | 11/1992 | Page et al. | 60/719 |
| 5,270,931 | A | * | 12/1993 | Appleford | 701/3 |
| 5,315,819 | A | * | 5/1994 | Page et al. | 60/39.282 |
| 5,345,386 | A | * | 9/1994 | Mullen et al. | 701/100 |
| 7,471,996 | B2 | * | 12/2008 | Bartel | 701/4 |
| 2004/0267414 | A1 | | 12/2004 | Bartel | |

OTHER PUBLICATIONS

International Search Report dated Dec. 27, 2006 w/ English translation.
Written Opinion of the International Searching Authority w/ English translation, dated Dec. 27, 2006.

\* cited by examiner

*Primary Examiner* — James Trammell
*Assistant Examiner* — Thanh V Nguyen
(74) *Attorney, Agent, or Firm* — Dickinson Wright PLLC

(57) ABSTRACT

The invention concerns a device (1) comprising means (6A, 6B, 6n) which determine for each of the engines of the aircraft, an individual minimum flexible temperature and means (8) which determine a global minimum flexible temperature based on said individual minimum temperatures, enabling a maximum available thrust to be calculated.

10 Claims, 2 Drawing Sheets

Figure 1:
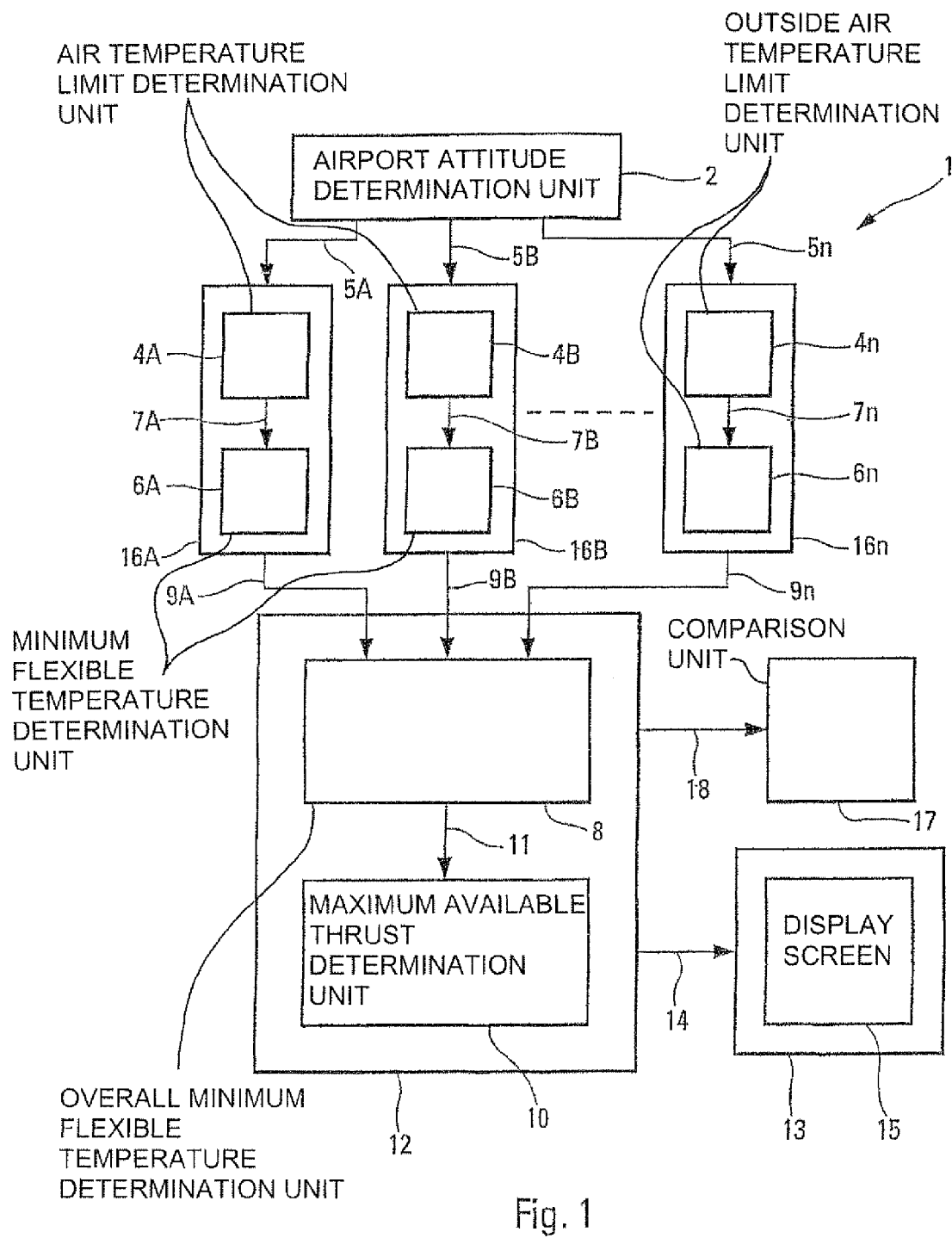

METHOD AND DEVICE FOR PROVIDING AN MULTI-ENGINE AIRCRAFT PILOT WITH DATA CONCERNING SAID ENGINES

The present invention relates to a method and a device for providing a pilot of an aircraft which is fitted with a number of engines, with information relating to the engines of said aircraft.

More specifically, it is an object of the present invention to provide information relating to the maximum power that the aircraft engines are able to deliver for given outside conditions (temperature, altitude).

It is known that, for each engine, a maximum thrust is associated with each certified engine speed, particularly a maximum "cold weather" takeoff thrust. This maximum thrust is maintained until an imaginary outside air temperature, known as the "breakpoint temperature" is reached. To monitor an engine, consideration is generally given, in addition to this maximum thrust, to an exhaust gas temperature known by its English-language abbreviation EGT, which represents the temperature of the gases at the low-pressure turbine of the engine. Beyond the breakpoint, for each certified engine speed, this temperature (EGT) is kept constant, this corresponding to an engine thrust that decreases as the outside air temperature increases. This temperature (EGT) is measured using a probe and is used to monitor the deterioration of the engine in service. For these reasons, a temperature limit known by its English-language expression "red line" is defined during engine certification testing and is declared to the certification authorities. When an engine in service reaches this red line temperature, it has to be removed for reconditioning or, if possible, reprogrammed for a lower certified engine speed corresponding to a lower exhaust gas temperature, this of course having the effect of reducing the maximum thrust that the engine can then provide.

It is an object of the present invention to remedy these disadvantages. The invention relates to a method for providing a pilot of an aircraft which is fitted with a number of engines with information relating to the engines of said aircraft that allows the aforementioned disadvantages to be remedied.

To this end, according to the invention, said method is notable in that:
a) the actual altitude and the actual outside air temperature of an airport at which said aircraft is located are determined;
b) for each of the engines of said aircraft, said actual altitude and said actual outside air temperature are used to determine an outside air temperature limit for which the engine provides a predetermined maximum thrust (the aforementioned "cold weather" maximum takeoff thrust) if operating at a predetermined exhaust gas temperature limit (the aforementioned "red line" value);
c) for each of said engines, the corresponding outside air temperature limit determined in step b) is used to determine an individual minimum flexible temperature for the engine; and
d) from the individual minimum flexible temperatures thus determined for all the engines of the aircraft, an overall minimum flexible temperature is determined.

Advantageously, in an additional step, said overall minimum flexible temperature determined in step d) is used to calculate a maximum available thrust illustrating the maximum thrust that the engines of the aircraft are able to supply at said airport at said actual outside air temperature.

Thus, by virtue of the invention, the pilot knows the maximum thrust that the various engines of the aircraft are able to provide on a given day at a given airport.

In addition, advantageously, in an additional step, a pilot of the aircraft is presented, at least on a display screen with at least the overall minimum flexible temperature determined in step d) and possibly said maximum thrust available.

Furthermore, advantageously, in an additional step:
said overall minimum flexible temperature determined in step d) is compared with a flexible temperature, selected via a pilot of the aircraft in order to set the engines of said aircraft; and
a check is carried out to verify that this flexible temperature remains higher than said overall minimum flexible temperature.

It is known that a flexible temperature such as this is input by the pilot into the engine control system and its purpose is to fool the engine into believing that it is operating at an outside air temperature that is higher than the actual temperature, the effect of this being to reduce the engine thrust and therefore the engine operating temperature.

In a preferred embodiment, in step b), the outside air temperature limit is determined, for each of the engines of the aircraft as the assumed outside air temperature at which, at maximum thrust, the exhaust gas temperature is equal to its limit value.

Furthermore, advantageously, in step c), if the outside air temperature limit is below a breakpoint temperature and below the outside air temperature, the individual minimum flexible temperature T1 is determined for each of the engines of the aircraft using the following expression:

$$T1 = T2 + T3 - T4$$

in which:
T2 is the outside air temperature;
T3 is the breakpoint temperature; and
T4 is the outside air temperature limit.

Furthermore, advantageously, in step d), in order to determine the overall minimum flexible temperature:
the various individual minimum flexible temperatures are compared with one another; and
the highest individual minimum flexible temperature is selected to be the overall minimum flexible temperature (which therefore corresponds to the lowest engine thrust).

Thus, the aforementioned "red line" limit value is guaranteed never to be crossed on any of the aircraft engines.

The present invention also relates to a device for providing a pilot of an aircraft which is fitted with a number of engines with information relating to the engines of said aircraft, for example a transport airplane.

According to the invention, said device is notable in that it comprises:
first means for determining the actual altitude and the actual outside air temperature of an airport at which said aircraft is located;
a plurality of second means each of which is formed in such a way as to determine, in respect of that one of the engines of said aircraft with which it is associated, and using said actual altitude and said actual outside air temperature, an outside air temperature limit for which the engine provides a predetermined maximum thrust if operating at a predetermined exhaust gas temperature limit;
a plurality of third means each of which is formed in such a way as to determine, in respect of that one of said engines with which it is associated, and using the corresponding outside air temperature limit, an individual minimum flexible temperature for the engine; and fourth means for determining an overall minimum flexible temperature from the individual minimum flexible temperatures thus determined for all the engines of the aircraft.

In one particular embodiment, said device additionally comprises:

fifth means for determining, using said overall minimum flexible temperature, a maximum available thrust, illustrating the maximum thrust that the engines of the aircraft are able to provide at said airport at said actual outside air temperature; and/or sixth means for presenting a pilot of the aircraft at least on a display screen with at least the overall minimum flexible temperature determined by said fourth means.

In a preferred embodiment, the second and third means associated with at least one of said engines form part of an engine control unit used to set said engine.

The figures of the attached drawing will make it easy to understand how the invention may be achieved. In these figures, identical references denote elements that are similar.

FIG. 1 is a block diagram of a device according to the invention.

Figure 2:
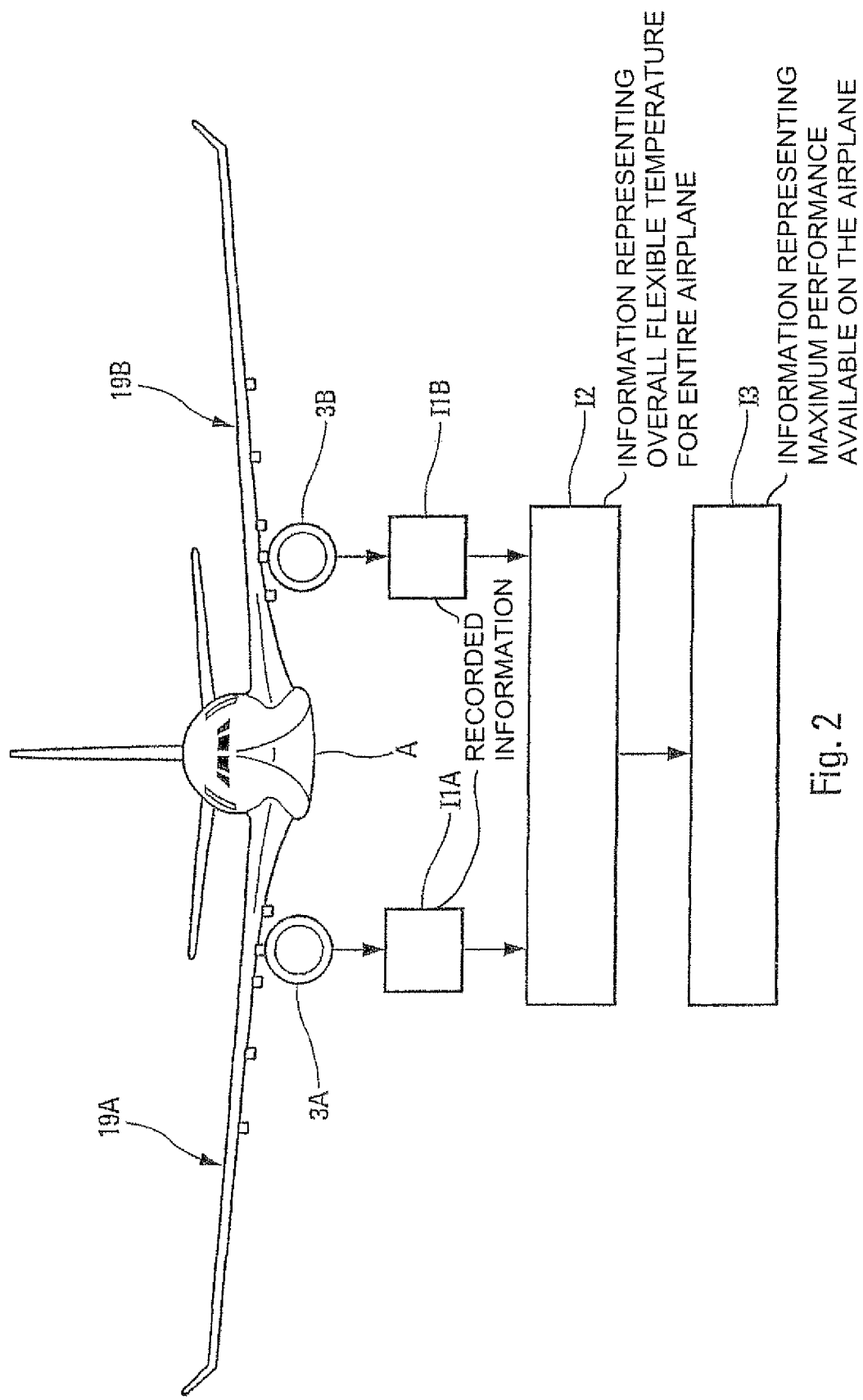

FIG. 2 schematically illustrates some of the information obtained using a device according to the invention on a twin-engined airplane.

The device 1 according to the invention and depicted schematically in FIG. 1 is intended to provide a pilot of an aircraft A which is fitted with a number of engines 3A, 3B, ..., 3n, for example a twin-engined or four-engined transport airplane, with information relating to the engines 3A, 3B, ..., 3n of said aircraft A.

To do this, said device 1 comprises, according to the invention:

a collection 2 of customary means for determining:
on the one hand, the actual attitude of the airport (not depicted) at which said aircraft A is located; and
on the other hand, the actual outside air temperature at said airport;

a plurality of means 4A, 4B, ..., 4n each of which is associated with one of the engines 3A, 3B, ..., 3n of the aircraft A and is connected via respective links 5A, 5B, 5n to said collection of means 2. Each of said means 4A, 4B, ..., 4n is formed in such a way as to determine, for the engine with which it is associated, using the information (actual altitude and actual outside air temperature) received from said collection of means 2, an outside air temperature limit known by its English-language acronym OATL, for which the associated engine provides a predetermined maximum thrust (the usual maximum thrust for cold-weather takeoff) if it is operating at a predetermined EGT limit (the usual so-called "red line" limit);

a plurality of means 6A, 6B, ..., 6n each of which is associated with one of said engines 3A, 3B, ..., 3n and is connected via a link 7A, 7B, ..., 7n to one of said means 4A, 4B, ..., 4n. Each of said means 6A, 6B, ..., 6n is formed in such a way as to determine, in respect of the engine with which it is associated, from the corresponding outside air temperature limit received from the means 4A, 4B, ..., 4n to which it is linked, an individual minimum flexible temperature for the associated engine 3A, 3B, ..., 3n; and means 8 for determining an overall minimum flexible temperature from the individual minimum flexible temperatures received from said means 6A, 6B, ..., 6n via links 9A, 9B, ..., 9n.

Furthermore, in a preferred embodiment, said device 1 additionally comprises means 10:

which are connected via a link 11 to said means 8; and
which are formed in such a way as to determine, using the overall minimum flexible temperature received from said means 8, a maximum available thrust illustrating the maximum thrust that the engines 3A, 3B, ..., 3n of the aircraft A are able to provide at said airport at said actual outside air temperature.

Thus, by virtue of the device 1 according to the invention, the pilot of the aircraft A knows the maximum thrust that the various engines 3A, 3B, ..., 3n of the aircraft A are able to provide on a given day at a given airport.

It will also be noted that, by virtue of the invention, the maximum available thrust changes continuously, thus allowing an airline to maximize the operational performance of its airplanes.

In one particular embodiment, said means 8 and 10 can be grouped together into a central unit 12.

Furthermore, in a preferred embodiment, said device 1 additionally comprises display means 13 which are, for example, connected via a link 14 to said central unit 12 and which are able to display, on at least one display screen 15 belonging to the aircraft A, information from said central unit 12 and, in particular, the overall minimum flexible temperature determined by said means 8. Of course, said display means 13 may also present the pilot of the aircraft A with other information, particularly the maximum available thrust determined by said means 10.

Furthermore, in one preferred embodiment, said means 4A, 4B, 4n determine the outside air temperature limit (the aforementioned OATL) as follows each time:

for constant maximum "cold weather" takeoff thrust, the exhaust gas temperature EGT increases with the outside air temperature;

by extrapolating this characteristic, the OATL is the imaginary outside air temperature at which, at the maximum "cold weather" takeoff thrust, the EGT is at the aforementioned "red line" temperature.

Furthermore, said means 6A, 6B, 6n determine the individual minimum flexible temperature as follows each time:

if the OATL is above or equal to the breakpoint, there is no individual minimum flexible temperature and the engine can provide the maximum thrust for the certified engine speed in question, for the outside conditions of the day; and if the OATL is below the breakpoint, the individual minimum flexible temperature is obtained as follows:

if the outside air temperature is below or equal to the OATL, there is no individual minimum flexible temperature and the engine can provide the maximum thrust for the certified engine speed considered for the outside conditions of the day; and if the outside air temperature is above the OATL, the individual minimum flexible temperature is obtained using the following expression:

individual minimum flexible temperature=outside air temperature+breakpoint temperature−OATL.

In one particular embodiment, the means 4A, 4B, 4n and the means 6A, 6B, 6n which are associated with one and the same engine 3A, 3B, 3n are each incorporated into the customary engine control unit 16A, 16B, 16n used to control said engine 3A, 3B, 3n.

Furthermore, in order to determine the overall minimum flexible temperature, said means 8:

automatically compare the various individual minimum flexible temperatures received with one another; and automatically select the highest individual minimum flexible temperature (which therefore corresponds to the lowest engine thrust) to use as the overall minimum flexible temperature.

In this way, it can be guaranteed that the aforementioned "red line" limit value will never be crossed on any of the engines 3A, 3B, 3n of the aircraft A.

It is also conceivable, in order to determine the overall minimum flexible temperature, for the device 1 to display the various individual minimum flexible temperatures on a display screen, for example, on the display screen 15 and for the pilot then to select the overall minimum flexible temperature and inform said device 1 of this choice using an appropriate element (for example, a computer keyboard) which preferably forms part of said means 8.

FIG. 2 depicts some of the information obtained using the invention on the example of an airplane A fitted with two engines 3A and 3B installed on its wings 19A and 19B, namely:

in respect of each of said engines 3A and 3B, information I1A, I1B which corresponds respectively to the individual minimum flexible temperatures recorded by the associated control units 16A and 16B;

information I2 representing the overall minimum flexible temperature for the entire airplane A, determined by the means 8; and information I3 (determined by the means 10) representing the maximum performance available on the airplane A on the given day with these two engines 3A and 3B.

Furthermore, in one particular embodiment, said device 1 additionally comprises means 17 which are, for example, connected by a link 18 to said central control unit 12 and which are intended:

to compare said overall minimum flexible temperature determined by the means 8 against a flexible temperature selected by a pilot of the aircraft A with a view to setting the engines 3A, 3B, 3n of said aircraft A; and to check that this flexible temperature remains higher than said overall minimum flexible temperature.

It is known that a flexible temperature such as this input by the pilot into the engine control system for each engine 3A, 3B, 3n is intended to fool the engine 3A, 3B, 3n into believing that it is operating at an outside air temperature that is hotter than the actual air temperature, the effect of this being to reduce the thrust of the engine 3A, 3B, 3n and therefore its operating temperature.

It will also be noted that, by virtue of the device 1 according to the invention, an engine remains in service for longer before having to be removed, thus allowing airlines to operate the engines for longer under the best of operating conditions.

The invention claimed is:

1. A method for providing a pilot of an aircraft, the aircraft having a plurality of engines, with information relating to the plurality of engines of said aircraft, the method comprising the steps of:

a) determining actual altitude and actual outside air temperature at an airport at which said aircraft is located;

b) determining an outside air temperature limit for each of the engines from the determined actual altitude and actual outside air temperature at the airport and from a predetermined maximum thrust for each corresponding engine operating at a predetermined exhaust gas temperature limit;

c) determining a minimum flexible temperature for each of said engines, from the outside air temperature limit determined in step b) for each corresponding engine; and d) determining by a processor an overall minimum flexible temperature for the plurality of engines from each individual minimum flexible temperature determined in step c), wherein the overall minimum flexible temperature for the plurality of engines is selected as the highest individual minimum flexible temperature determined in step c).

2. The method as claimed in claim 1, further comprising a step of calculating a maximum available thrust for each engine from the overall minimum flexible temperature determined in step d).

3. The method as claimed in claim 1, further comprising a step of presenting the overall minimum flexible temperature determined in step d) on a display screen.

4. The method as claimed in claim 1, further comprising the steps of:

comparing said overall minimum flexible temperature determined in step d) with a predetermined minimum flexible temperature, said predetermined minimum flexible temperature being selected by the pilot; and verifying that the predetermined minimum flexible temperature remains higher than said determined overall minimum flexible temperature.

5. The method as claimed in claim 1, further comprising a step of determining each individual minimum flexible temperature $T1$, when the outside air temperature limit is below a breakpoint temperature, according to the following expression:

$$T1 = T2 + T3 - T4 \text{ in which:}$$

$T2$ is the outside air temperature;

$T3$ is a breakpoint temperature; and $T4$ is the outside air temperature limit.

6. A device for providing a pilot of an aircraft, the aircraft having a plurality of engines, with information relating to the plurality of engines of said aircraft, comprising:

altitude and temperature determining device that determines actual altitude and actual outside air temperature at an airport at which said aircraft is located;

a plurality of outside temperature limit determining devices in which each of the limit determining devices determines an outside temperature limit for each engine from the actual altitude and actual outside air temperature determined by the altitude and temperature determining device, and from a predetermined maximum thrust for each corresponding engine operating at a predetermined exhaust gas temperature limit;

a plurality of minimum flexible temperature determining devices that determines a minimum flexible temperature for each of said engines from each corresponding outside air temperature limit determined by the plurality of outside temperature limit determining devices for each corresponding engine; and overall minimum flexible temperature determining device that determines an overall minimum flexible temperature from each of the minimum flexible temperatures determined by the plurality of minimum flexible temperature determining devices, wherein the overall minimum flexible temperature is selected as the highest individual minimum flexible temperature determined by the plurality of minimum flexible temperature determining devices.

7. The device as claimed in claim 6, comprising a maximum thrust calculating device that calculates a maximum available thrust for each engine from the overall minimum flexible temperature determined by overall minimum flexible temperature determining device.

8. The device as claimed in claim 6, comprising a display screen that displays the overall minimum flexible temperature determined by said overall minimum flexible temperature determining device.

9. The device as claimed in claim 6, wherein the plurality of limit determining devices and the plurality of minimum flexible temperature determining devices form part of an engine control unit.

10. An aircraft, comprising the device of claim 6.

* * * * *